Feb. 23, 1937.                C. F. AXELSON                2,071,315
                                MICROMETER
                              Filed May 2, 1934

INVENTOR:

Charles F. Axelson

Patented Feb. 23, 1937

2,071,315

UNITED STATES PATENT OFFICE 2,071,315

MICROMETER

Charles F. Axelson, Los Angeles, Calif.

Application May 2, 1934, Serial No. 723,537

6 Claims. (Cl. 33—164)

My invention relates to measuring devices and has particular reference to the caliper type of instrument, one form of which is well known under the name of micrometer.

The employment of the usual type of micrometer for ordinary measurements of machine parts and the like, requires considerable skill owing to the fact that the part being measured is often mounted in a machine, and because the micrometer is calibrated in thousandths of an inch rather than in the fractions in common use, which are expressed in small integers.

It is common practice in the making of drawings to designate the measurements of the various parts in fractions represented by small integers. In order to use the usual micrometer to measure a part under construction, the mechanic must first translate the measurement desired, as shown on the drawing, into thousandths of an inch, then make the measurements upon the part, and then convert the result back into fractions represented by small integers in order to determine whether the measured part corresponds to the measurement expressed upon the drawing. For example, it is necessary in measuring $\frac{1}{32}$nd of an inch to translate this into decimal parts of an inch, as .03125, and then to employ the micrometer to measure the part in a machine, reading from the micrometer scale the measurement in decimal parts of an inch. Then the mechanic is required to translate the measurement so obtained back to the small fractions. In other words, he must employ a micrometer to obtain the measurement, and then in addition refer to a translation chart which gives the relative values of the fractions to the decimals. This procedure is particularly undesirable when the mechanic who is performing operations upon a machine is not highly skilled, and particularly where the permissible variation from the required measurement is small. The unskilled mechanic then becomes involved in serious difficulties in determining whether the part measured is within the limits of tolerance.

It is, therefore, an object of my invention to provide a measuring instrument of the micrometer type in which the reading of the micrometer in fractions of an inch, expressed in small integers, may be achieved directly without reference to tables, translation charts, or complicated calculations in order to determine the reading.

Another object of the invention is to provide a micrometer having divisions upon the barrel of the instrument expressed in fractions representing small integers and employing a thimble surrounding the barrel bearing graduations representing a relatively large number of small divisions lying between the fractional divisions expressed upon the barrel.

Another object of the invention is to provide a micrometer having a pitch of screw representing a fraction of an inch expressed in small integers and having a thimble operable with respect to a datum line upon the barrel calibrated in divisions of the fraction represented by the pitch of the screw.

Another object of the invention is to provide a rotatable thimble with means for indicating to the sense of touch the measurements corresponding to complete circuits of the thimble.

A further object of the invention is to provide means for reading an actual measurement upon the thimble, instead of merely arbitrary divisions of its periphery.

Figure 1:
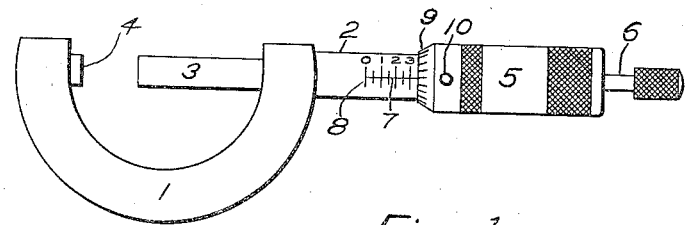
Figure 1 is an elevational view of a micrometer constructed and graduated in accordance with my invention.

Referring to the drawing, I have illustrated in Fig. 1 a micrometer having a yoke or U-shaped frame 1 having an outwardly extending barrel 2, which as is usual in such constructions, is provided with a longitudinal bore, internally threaded (not shown in detail) through which extends the screw of the micrometer, one end of which forms a spindle 3 movable relative to an anvil 4 to bring the anvil and spindle into contact with a work-piece to be measured.

The screw is usually arranged to be rotated by means of a thumb-piece or thimble 5, rotatably mounted upon the barrel 2, so that by rotating the thimble the spindle is moved toward and away from the anvil. The outer end of the thimble is illustrated as being provided with the usual fingerpiece 6 frictionally connected to the thimble 5 so that by rotating the fingerpiece the thimble is rotated until the force of contact of the spindle with the anvil, or with the workpiece, is such as to overcome the frictional engagement of the fingerpiece with the thimble. The construction thus far described is that of the usual well known micrometer.

The barrel is illustrated as being calibrated with a datum line 7 crossed by a number of calibrations 8, the calibrations being spaced from each other by an amount representing the longitudinal movement of the spindle when the thimble is moved through one complete revolution. Hence, if the pitch of the threads of the screw and the barrel is $\frac{1}{32}$nd of an inch, rotation of the thimble through one revolution will cause the spindle to move a distance equal to $\frac{1}{32}$nd of an inch, and this distance is represented by the space between two adjacent calibrations upon the scale marked upon the barrel. These barrel calibrations, bearing the same reference numerals as in Fig. 1, are shown in detail in Fig. 3.

With the device thus far described, it will be apparent that any fraction of an inch which may be expressed in $\frac{1}{32}$nd of an inch, or multiple thereof, may be accurately measured by rotating the thimble to expose the corresponding calibration upon the scale of the barrel. Thus with the calibration stated above, it will be possible for a mechanic to measure accurately the following fractions: $\frac{1}{32}$, $\frac{1}{16}$, $\frac{3}{32}$, $\frac{1}{8}$, $\frac{5}{32}$, $\frac{3}{16}$, $\frac{7}{32}$, $\frac{1}{4}$, $\frac{9}{32}$, $\frac{5}{16}$, $\frac{11}{32}$, $\frac{3}{8}$, $\frac{13}{32}$, $\frac{7}{16}$, $\frac{15}{32}$, $\frac{1}{2}$ and so on up to one inch, thus permitting the mechanic to accurately measure 32 fractional measurements of an inch directly upon the barrel.

It will be noted at this point that the fractions which are directly measurable are those fractions in which the measurements upon a drawing will ordinarily be expressed. This eliminates the necessity of translating such measurements into decimal parts of an inch, or of changing a decimal micrometer reading back to simple fractions for comparison with a measurement upon the drawing.

It is the usual practice in marking measurements upon drawings, to express fractions of an inch in 64ths, or multiples of 64ths, such as $\frac{1}{8}$ inch, $\frac{1}{32}$ inch, 3/64 inch, $\frac{1}{16}$ inch, all of which are measurable upon the usual ruler or scale. In other words, it is not the common practice to express measurements upon drawings in such fractions as $\frac{1}{10}$ inch or 1/25 inch or other fractions employing the decimal system. Yet micrometers are universally made as if such decimal fractions were the ones in common use, and it is therefore necessary to convert the fractions upon the drawing into thousandths before the measurements can be made with the usual micrometer, and even then the fractions are expressible only by the employment of a large number of digits, which, in some instances, even when carried to five and six places, do not evenly express the fraction. I therefore prefer that the pitch of the micrometer screw correspond to one of the fractions in common use. Thus, when reference is made herein to "non-decimal" parts of an inch, it is to be understood that this expression is used to distinguish my selected fractions from fractions which are evenly divisible by 10.

Figure 2:
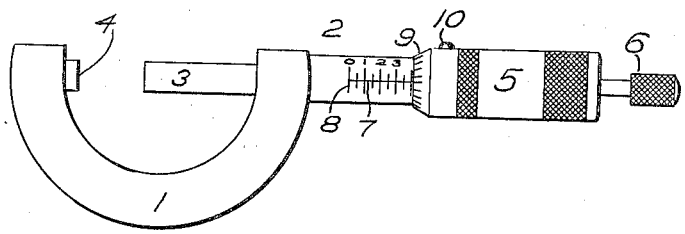
Figure 2 is an elevational view similar to Figure 1, but illustrates the thimble as rotated to 90 degrees from the position shown in Figure 1.
Figures 3, 4:
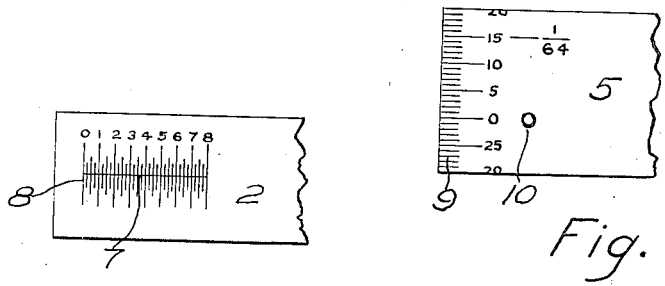
Figure 3 is a diagrammatic view of the barrel illustrating the graduations employed in accordance with a preferred form of my invention.
Figure 4 is a diagrammatic view of the complete circumference of the thimble showing suitable calibrations in accordance with my invention.

For measuring other minute fractions less than $\frac{1}{32}$nd of an inch, the thimble may be provided with a number of calibrations spaced about its periphery, such calibrations being designated by the reference character 9 in Figs. 1, 2 and 4. Preferably, the number of these equally spaced calibrations is such that the movement of the thimble through an arc equal to that between adjoining calibrations will cause the spindle to move longitudinally through a distance substantially equal to the smallest fraction of an inch that it is practical to use in ordinary industrial practice. If the pitch of the screw is $\frac{1}{32}$nd of an inch, 30 calibrations upon the periphery of the thimble, as shown in Fig. 4, will permit the accurate measurement of 1/30th of $\frac{1}{32}$nd of an inch—that is 1/960th, or multiples thereof.

Thus it will be observed that while the fractions which are represented by the calibrations upon my instrument are all expressed in small integers, the instrument will be capable of measuring substantially .001 inch. Further, any one of the fractions may be accurately and directly read from the instrument without reference to translation tables and without the exercise of mathematics to determine the measurement.

A graduation upon the thimble may, if desired, be marked by the fraction of an inch represented by that mark; for example, with the scale described above, the 15th graduation may have inscribed near it the fraction 1/64th so that with the pitch of the screw as $\frac{1}{32}$nd of an inch, 1/64th of an inch, or odd multiples thereof, may readily be measured by aligning the 15th graduation with the datum line upon the spindle. This will permit all the measurements inscribed on the usual mechanic's rule to be accurately and directly read on my micrometer—half of them on the barrel, and the other half on the thimble. The smallest division on the ordinary rule is 1/64th of an inch. The even 64ths, or 32nds, are calibrated on the barrel; and the intervening, or odd, 64ths may be accurately read on the thimble by aligning the thimble calibration marked 1/64 with the datum line on the barrel.

To illustrate one of the uses of my invention, it is common in industrial practice to designate upon a drawing that a part is to measure 3/64ths of an inch, while either through a general order prevailing in the shop, or through a special order expressed upon the drawing, the permissible error is .001 inch above or below the measurement expressed upon the drawing. Thus a mechanic with my instrument may measure the work-piece upon which he is engaged, and by merely counting the number of calibrations upon the thimble 5 between the 64th line and the calibration aligned with the datum line on the barrel, he will know directly that the piece is that number of thousandths of an inch (960ths, to be exact) larger or smaller than the desired 3/64ths of an inch; whereas, employing the usual micrometer, it will be necessary for him first to translate 3/64ths of an inch into decimal parts of an inch, and this, unfortunately, is represented by .046875, of which the usual micrometer can read directly only the first three digits, namely, .046, and the mechanic is required to merely guess at the proper setting of the micrometer for the remaining three digits. Assuming that his work-piece is not exactly at the .046 reading on the micrometer, he is at a total loss to know how much above or below the desired measurement the piece actually measures. All of this work requires the constant reference to the decimal translation table, and after all such reference, the mechanic is still unable to accurately determine his measurements.

Thus it will be observed that by employing the scales illustrated and described herein, accurate measurements to all the fractional parts of an inch which may be represented in small integers may be obtained, while still further smaller fractions and divisions thereof may be accurately obtained by a direct reading of the thimble calibrations.

The selection, for the purposes of illustration, of the screw pitch at 1/32nd of an inch and the selection of the number of calibrations upon the thimble at 30, is but an arbitrary one, selected particularly because the product of 32×30, or 960, is evenly divisible by a large number of factors, and yet the measurement expressed is only 1/24,000 of an inch larger than 1/1000th of an inch—a difference impossible to read on an ordinary micrometer, so that 1/960th of an inch may, for purposes of shop practice, be considered as 1/1000th of an inch. Again, with 30 calibrations upon the scale on the thimble, substantially accurate measurements of 1/1920th of an inch may be obtained, since this merely requires the setting of the datum line approximately halfway between any two adjacent calibrations upon the thimble. Still further minute divisions can be obtained by setting the datum line 1/4 or 3/4 of the distance between any two adjacent calibrations, which points may be determined by the ordinary mechanic with reasonable accuracy, and certainly with far more accuracy than it is possible for him to guess at minute decimal divisions.

It is also practical to use 32 divisions upon the thimble. This splits every thirty-second of an inch into 32 equal parts, and permits the accurate measurement of 1/1024th of an inch, or multiples thereof. For practical purposes, these divisions may also be considered as one-thousandth of an inch, as they are only 2.4% smaller than that.

By referring particularly to Figures 1 and 2, it will be observed that the thimble is provided with a projecting pin 10 preferably smooth and projecting but slightly above the surface of the thimble. With this arrangement, a mechanic may, by placing his finger in the path of movement of the projection pin, accurately count the number of complete circuits of the thimble, and thus without using sight may set his instrument upon any of the fractions represented by the calibrations upon the barrel scale 7 and 8. Further, he may use this manner of setting the instrument for obtaining roughly the desired setting and then use sight only for the accurate setting of the calibrations of the thimble with reference to the datum line 7. This method of setting the instrument in practice saves a great deal of time and renders the use of the instrument much easier than if all the settings had to be determined by sight.

It will be observed that other pitches of the screw and other numbers of divisions upon the barrel and thimble may be employed for different kinds of work, but any variation from the scales hereinbefore set forth should be governed by the consideration that the measurement obtained by the calibrations must represent fractions of an inch expressed in small integers so that the instrument when used will permit of the direct reading of the fractional parts of an inch.

While I have shown and described the preferred embodiment of my invention, it is to be understood that I do not wish to be limited to any of the details of construction defined herein, except as defined in the appended claims.

I claim:

1. In a micrometer employing a thimble rotatable about a barrel, a projection near the calibrated end of said thimble for indicating tactually one circuit of said thimble, said projection adapted to pass freely beneath a finger of the operator when said finger lies in the path of said projection, the plane of said path passing through said barrel.

2. In a micrometer employing a thimble rotatable about a barrel, a single node near the calibrated end of said thimble for tactually indicating one circuit of said thimble around said barrel, the parts of the periphery of said thimble lying in the path of said node having a smooth, unbroken surface excepting for said node and lying in a plane passing through said barrel, said node adapted to pass freely beneath the operator's finger when said finger lies in the path of said node.

3. In a micrometer employing a thimble attached to a threaded spindle and rotatable about a barrel, a lug on said thimble near the calibrated end thereof for indicating tactually when said thimble has turned through a complete circuit, said lug being sufficiently short to pass freely beneath the operator's finger when said finger is placed in the path of said lug the plane of said path passing through said barrel; and an axial line on said thimble having indicating numerals showing the fraction of an inch represented by one-half revolution of said thimble.

4. In a micrometer employing a thimble attached to a threaded spindle and rotatable about a barrel, a single lug near the calibrated end of said thimble for tactually indicating a predetermined unit of measurement or a fraction thereof, and an axial line on said thimble located diametrically opposite from said lug, said lug adapted to pass freely beneath a finger of the operator when said finger lies in the path of said lug, the plane of said path passing through said barrel.

5. In a micrometer employing a thimble attached to a threaded spindle having a pitch of one thirty-second of an inch, said thimble rotatable about a barrel having a datum line thereon, a lug on said thimble for tactually indicating one circuit thereof, a reference line on said thimble longitudinally aligned with said lug, and an axial line on said thimble located diametrically opposite from said lug, and the numerals, 1/64, marked by said axial line.

6. In a micrometer employing a thimble attached to a threaded spindle having a pitch of 1/32nd of an inch, said thimble rotatable about a barrel, said thimble having a reference line and twenty-nine other equally spaced lines around the periphery thereof, a lug longitudinally aligned with said reference line for tactually indicating one circuit of said thimble around said barrel, and an axial line on said thimble in longitudinal alignment with one of said equally spaced lines, said axial line located diametrically opposite from said lug, and the numerals 1/64 marked adjoining said axial line.

CHARLES F. AXELSON.